United States Patent [19]

Rose

[11] Patent Number: 5,059,053

[45] Date of Patent: Oct. 22, 1991

[54] TUBE CLAMP WITH LOCATOR TAB

[75] Inventor: John A. Rose, Brighton, Mich.

[73] Assignee: O & S Manufacturing Company, Whitmore Lake, Mich.

[21] Appl. No.: 372,888

[22] Filed: Jun. 28, 1989

[51] Int. Cl.[5] ............................................. F16D 1/00
[52] U.S. Cl. .................................... 403/24; 403/373; 403/290; 403/344
[58] Field of Search ................... 403/77, 118, 373, 76, 403/110, 344, 290, 43, 24

[56] References Cited

U.S. PATENT DOCUMENTS

| | | |
|---|---|---|
| 2,710,207 | 6/1955 | Mueller ............................... 403/373 |
| 2,983,982 | 5/1961 | Solum et al. . |
| 3,460,788 | 8/1969 | Goldman . |
| 3,477,106 | 11/1969 | Tetzlaff et al. . |
| 4,078,281 | 3/1978 | Pease et al. . |
| 4,369,999 | 1/1983 | Kashima ......................... 403/373 X |
| 4,614,451 | 9/1986 | Braisted, Jr. .......................... 403/43 |

Primary Examiner—Andrew V. Kundrat
Attorney, Agent, or Firm—Gifford, Groh, Sprinkle, Patmore and Anderson

[57] ABSTRACT

A positive stop clamp for clamping a cross tube of a tie rod to a tie rod end includes a one-pieced clamp body having a U-shape cross section and a locking fastener. The clamp body includes two flat ends, each end having a pair of inwardly bent ears whereby a substantially circular interior is defined. The body further includes a cantilevered locator tab having a flange at its end. The flange abuts the end of the cross tube to locate the clamp at the desired point on the tube.

5 Claims, 1 Drawing Sheet

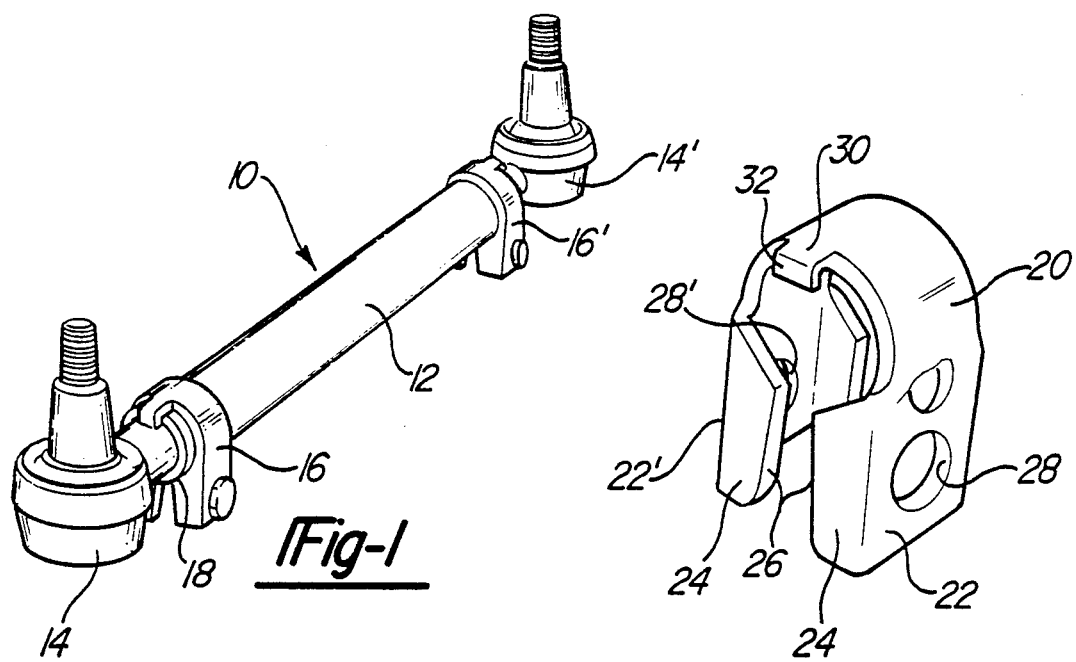
Fig-1
Fig-2
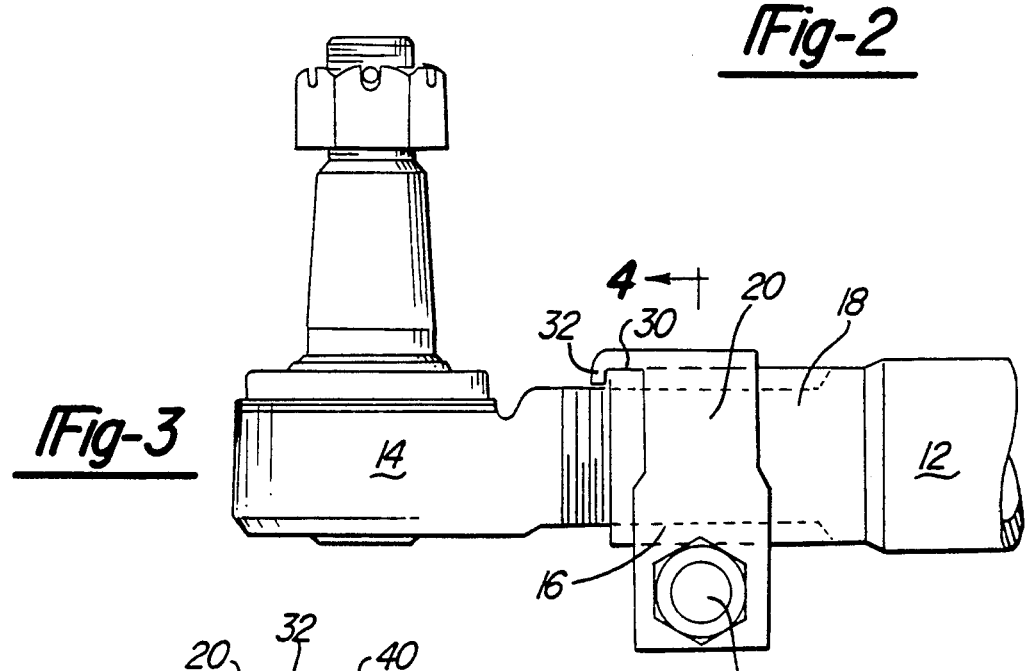
Fig-3
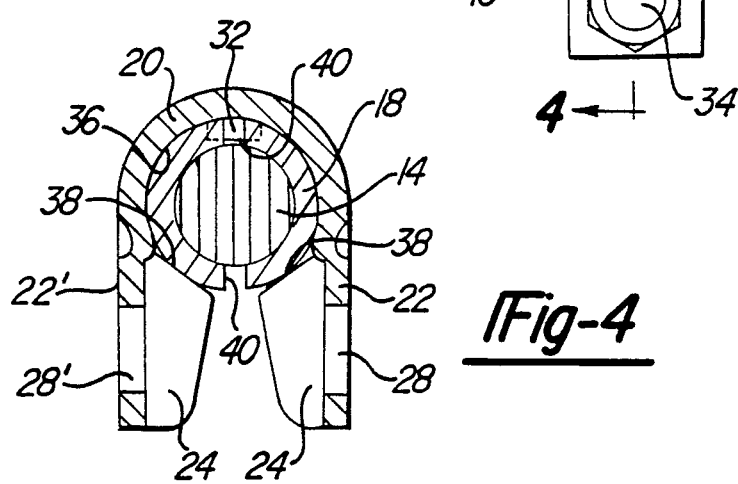
Fig-4

5,059,053

TUBE CLAMP WITH LOCATOR TAB

BACKGROUND OF THE INVENTION

I. Field of the Invention

The present invention relates generally to clamp assemblies. More particularly, the present invention relates to a tie rod clamp having a locator tab for locating the clamp on the cross tube of a tie rod assembly.

II. Description of the Relevant Art

Tube clamps are employed in a variety of applications on the vehicle chassis. These clamps are often found in relation to the front end assemblies of vehicles, particularly in relation to drag links and tie rods.

In conjunction specifically with tie rods, the clamps are generally fitted about the ends of the cross tube interconnecting a pair of tie rod ends. These clamps fix the ends of the tube to the ends of the tie rod ends threadingly fitted into the interior of the tube.

Because the tie rod tube overlaps the interconnected tie rod ends for only a selectively limited length, proper placement of the clamp thereover is important. If the clamp is fitted and drawn up at a point closer to the middle of the tube beyond the tie rod end, the tube will collapse beneath the clamp for lack of internal support. Conversely, although less of a problem, if the clamp is fitted and drawn up at a point on the tube closer to its end, the significant advantage of frictionally engaging a maximum amount of surface area between the inner diameter of the tube and the threaded surface of the tie rod will be lost.

In response to the need to locate the clamp properly on the cross tube, a variety of approaches have been taken. One response has been to tackweld the clamp onto the cross tube before the tie rod end is inserted therein. While offering the advantage of locating the clamp, this approach compromises the integrity of the tube because of the excessive application of heat while removing the advantages of clamp interchangeability and easy replacement. Of course, this approach adds the further disadvantage of requiring an additional step in the assembly process.

As an alternative, beads of weld are applied to the outside of the cross tube to bracket the clamp therebetween. The clamp is thereafter fitted over the bead closest to the end of the tube and rests between the beads. Again this approach suffers from the risk of compromising the integrity of the metal because of the added heat and from the disadvantage of requiring more assembly steps.

As yet another approach to solving the problem of an improperly positioned clamp, the cross tube is manufactured with dimples as brackets between which the clamp is held. While eliminating known problems related to added welded beads or tackwelding, this approach still calls for added steps relating to production or assembly.

Accordingly, prior approaches to solving the problem of providing a proper locator for placement of clamps on cross tubes have failed. A system for providing clamps including a method of locating the clamps on the tubes is desired.

SUMMARY OF THE PRESENT INVENTION

The present invention provides a positive metal stop clamp for clamping a cross tube of a tie rod to a tie rod end. The clamp includes a one-pieced clamp body being U-shaped in cross section and a locking fastener.

The body includes two flat ends, each end having a pair of parallel inwardly bent ears whereby a substantially circular interior is defined by the body and ears in cross section.

The body further includes a cantilevered locator tab having a downwardly depending flange situated at its end.

The flange abuts the end of the cross tube to locate the clamp at the desired point on the tube. This construction minimizes pre-assembly otherwise necessary as the locator and clamp are provided as one. The locator tab thereby prevents the flange from travelling too far axially along the tube prior to the clamp's being drawn up by the tightening of a nut and bolt fastener.

The cross tube preferably includes two slots axially defined therein to allow for the tube to be compressed around the end of a tie rod. The flange of the locator is wider than the slot, thereby preventing its being caught within the slot upon rotation for fitting prior to tightening.

The construction of the clamp utilizing a locator tab offers a number of advantages in that the clamp may be rotated through 360° for infinite adjustment and placement. This aspect allows the cross tube to be freely rotated in one direction or the other for lateral adjustment of the rod ends. Because all clamps necessarily have a gap between their two ends, known beads slip through an assembly when rotated, thus jeopardizing proper locating.

In addition, the clamp according to the present invention utilizes material that is required during stamping to hold the parts during transfer in the progressive die. Normally, this material is sheared from the part and scrapped. However, according to the present invention this material is retained and applied as part of the clamp.

In addition, the clamp according to the present invention may be easily slipped into place, tightened, and subsequently loosened as required. By merely sliding the clamp onto the tube until the flange abuts the end of the cross tube, a standard and intended location is repeatedly found with a minimum of pre-assembly steps.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiment of the present invention when read in conjunction with the accompanying drawing in which like reference characters refer to like parts throughout the views and in which:

FIG. 1 is a peripheral view of a tie rod assembly with clamp assemblies of the present invention in place thereon;

FIG. 2 is a peripheral view of a clamp according to the present invention;

FIG. 3 is a side elevational view of a tie rod assembly end illustrating the clamp assembly of the present invention in place thereon; and FIG. 4 is a view in cross section taken along lines 4—4 of FIG. 3.

DETAILED DESCRIPTION OF THE PREFERRED EMBODIMENT OF THE PRESENT INVENTION

The drawing discloses the preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Referring to FIG. 1, a peripheral view of a tie rod is shown, generally indicated as 10. The rod 10 comprises a tie rod cross tube 12 and a pair of tie rod ends 14, 14'.

In place on the tube 12 at each of its ends are provided a pair of clamp assemblies 16, 16' according to the present invention. The clamp assemblies 16, 16' are hereshown properly located near the ends of the tube 12 to most advantageously secure each of the tie rod ends 14, 14' therein. The clamp assemblies 16, 16' according to the present invention do not move axially toward the middle of the tube 12 beyond their ideally located positions as shown.

The cross tube 12 includes a first internally threaded end 18 and a second internally threaded end 18'. The tie rod end 14 threads into the threaded end 18 and the tie rod end 14' threads into the threaded end 18'. This construction allows for inward or outward adjustment of the tie rod ends 14, 14' by rotational adjustment of the tube 12. When the tube 12 is rotated in one direction, the tie rod ends 14, 14' move inwardly simultaneously. When rotated in the other direction, the tie rod ends 14, 14' move outwardly simultaneously.

Normally rotational adjustment of the tube 12 in this clockwise/counterclockwise manner is not made until the assembly 10 is in place on the vehicle. After the tie rod ends 14, 14' are bolted in place, rotational adjustment of the tube 12 is made. The clamp assemblies 16, 16' of the present invention are particularly useful during the adjustment step where the assemblies 16, 16' may be freely rotated along with the tube 12 until proper adjustment is achieved. Prior methods of tack-welding or providing beads do not allow this rotation for the reasons discussed above. During the final adjustment, the assemblies 16, 16' may be left on the tube, an advantage not available in earlier clamping methods.

In addition, it is clear from this description and FIG. 1 that the assemblies 16, 16' may be rotated independent of the tube 12 after final adjustment but before the assemblies 16, 16' are drawn up to their tightened positions to thereby minimize any interference problems which may result from crowding elements of the vehicle's chassis.

With reference to FIG. 2, a clamp 20 is shown. The clamp 20 is the basic element of the clamp assemblies 16, 16' of FIG. 1.

The clamp 20 includes a pair of substantially flat ends 22, 22'. Each flat end 22, 22' includes two ears 24. The ears 24 are provided to give the clamp 20 added strength and to provide surfaces 26 which abut one another when the nut and bolt (not shown) of the clamp 20 are fully drawn against one another. The flat ends 22, 22' provide surfaces upon which the nut and bolt (not shown) may freely rotate during tightening once provided through a pair of bolt-receiving apertures 28, 28'. The ears 24 are substantially perpendicular to the ends 22, 22'.

The clamp 20 includes a cantilevered locator tab 30 having provided at the end thereof a downward depending flange 32. The locator tab 30 may be of a different length or width as may the flange 32, although the flange 32 must be wide enough so as not to slip into one of the slots of the end 18 of the tube 12 shown in FIG. 4.

Referring to FIG. 3, an elevational side view of one end of the assembly 10 is shown. This view illustrates how the flange 32 abuts the edge of the threaded end 18 of the tube 12 to thereby prevent the clamp assembly 16 from travelling too far axially along the tube 12.

To draw up the clamp 20 against the threaded end 18, the clamp 20 is provided with a nut and bolt assembly 34. Of course, other types of fasteners may be employed in lieu of the nut and bolt assembly 34.

FIG. 4 is a view in cross section taken along lines 4—4 of FIG. 3. This view illustrates a substantially circular interior 36 defined by the inner wall of the clamp 20 and further defined by upper surfaces 38 of the ears 24. The interior 36 thereby snugly accomodates the threaded end 18.

The threaded end 18 has defined therein a pair of slots 40. Although one slot 40 may be workable, two such slots are preferred. The slots 40 allow the end 18 to be slightly compressed to frictionally engage the outer correspondingly threaded surface of the tie rod end 14. The overlapping character of the preferred width of the flange 32 may be seen in this view. Of course, a greater number of flanges 32 may be provided. In addition, the position of the flange 32 relative to the clamp 20 may be altered if needed while still performing its positive stop function.

Having described my invention, however, many modifications thereto will become apparent to those skilled in the art to which it pertains without deviation from the spirit of the invention as defined by the scope of the appended claims.

I claim:

1. A tube clamp with a locator tab, comprising:

a cross tube having first and second internally threaded ends;

first and second threaded tie rod ends, said tie rod ends threadably engageable within said first and second threaded ends;

first and second clamps, said clamps coaxially positioned around said first and second threaded ends so as to frictionally engage said tie rod ends positioned therewithin, said clamps also having bolt-receiving apertures for mounting on said threaded ends; and said clamps each further comprising opposed terminal ends each having inwardly-directed ears and a downwardly depending flange joined to the clamp body at a point diametrically opposed to a slot defined by a pair of opposed ears, said ears providing additional frictional engagement of said tie rod ends, said flange abutting an edge of said threaded ends to prevent said clamp from travelling axially along said cross tube, and slots defined in said threaded ends, said slots being frictionally compressed and in turn frictionally engaging said corresponding tie rod end, said slots further being of limited width to prevent axial slippage of said depending flanges, and a cantilevered locator tab, said tab connecting said downward flange with said clamp.

2. The invention as described in claim 1, further comprising upper surfaces of said ears, said upper surfaces providing further frictional engagement of said tie rod ends.

3. The invention as described in claim 1, wherein said clamp is constructed of a steel material.

4. The invention as described in claim 1, wherein said clamps further comprise first and second flat ends, said flat ends surrounding said bolt-receiving apertures.

5. The invention as described in claim 1, further comprising a nut and a bolt for inserting into said bolt-receiving apertures and providing said frictional engagement to said tie rod ends.

* * * * *